United States Patent
Bryant

(10) Patent No.: US 7,346,149 B1
(45) Date of Patent: Mar. 18, 2008

(54) METHOD AND APPARATUS FOR REVERSIBLY CORRECTING NONLINEAR IMPAIRMENTS IN A COMMUNICATIONS CHANNEL

(75) Inventor: Paul Henry Bryant, Encinitas, CA (US)

(73) Assignee: Chaos Telecom, Inc., San Diego, CA (US)

( * ) Notice: Subject to any disclaimer, the term of this patent is extended or adjusted under 35 U.S.C. 154(b) by 1114 days.

(21) Appl. No.: 10/643,060

(22) Filed: Aug. 18, 2003

(51) Int. Cl.
*H04M 1/24* (2006.01)
*H04M 3/08* (2006.01)
*H04M 3/22* (2006.01)

(52) U.S. Cl. ............... 379/27.01; 379/1.03; 379/1.04; 379/23; 379/378

(58) Field of Classification Search ............... 379/1.01, 379/1.03, 1.04, 22.02, 22.03, 22.07, 23–24, 379/26.02, 27.01, 29.03, 29.04, 30, 32.04
See application file for complete search history.

(56) References Cited

U.S. PATENT DOCUMENTS

| | | | |
|---|---|---|---|
| 4,118,597 A * | 10/1978 | Proctor et al. .............. | 379/378 |
| 6,272,209 B1 | 8/2001 | Bridger et al. ................ | 379/27 |
| 6,275,050 B1 | 8/2001 | Born et al. .................. | 324/700 |
| 6,519,253 B1 | 2/2003 | Posthuma .................... | 370/359 |
| 7,020,246 B2 * | 3/2006 | Gao et al. ................... | 379/1.01 |
| 7,050,548 B2 * | 5/2006 | Bostoen et al. .......... | 379/27.01 |
| 7,230,970 B1 * | 6/2007 | Bryant ........................ | 375/130 |

OTHER PUBLICATIONS

United States Department of Agriculture Bulletin 1751H-501, Fundamentals of ISDN, pp. 1-26, no date.
Conference Paper Proceedings of the 34th Meeting of IEEE Holm Conference on Electrical Contacts, 1988, IEEE Cat. No. 88CH2604-7, The Effects of Current on Stationary Contact Behavior, W.W. Bennett, pp. 267-276.
Physical Review B, vol. 43, No. 2, Jan. 15, 1991-I, Degraduation and Regeneration of Copper Electrical Junctions, pp. 1433-1440.
Conference Paper INTELEC, Tenth Int'l Telecommunications Energy Conference, 1988, IEEE Cat. No. 88CH2653-4, Sealing Current and Its Impact on ISDN Powering Requirements, Frantz and Taylor, pp. 151-155.
Splice-induced Impairments on Very-High Speed Digital Data Communications Over Coper Telephone Networks, K. Sistanizadeh, pp. 3-15, UCLAScience & Engineering Library.
Analysis of the Noice Environment in Fugure Twisted-Pair Access Technologies, Magesacher, Haar, and Zukunft, Institute for Integrated Circuits—Bridgelab, munich, Germany, pp. 1-5.
Standards for ISDN-Basic Access Interface for Application on the Network Side of the NT, Layer 1 Specification, Sealing Current Provisioning, S.G. Ungar, TIE1.4 Technical Subcommitte Working Group Members, pp. 1-26.

* cited by examiner

*Primary Examiner*—Binh K. Tieu
(74) *Attorney, Agent, or Firm*—INCAPLAW; Terrance A. Meador

(57) ABSTRACT

In a transmission line, nonlinear impairments resulting from imperfect splices are mitigated by providing a bias current that shifts the operating points of these impairments resulting in improved stability, conductivity and linearity.

20 Claims, 2 Drawing Sheets

METHOD AND APPARATUS FOR REVERSIBLY CORRECTING NONLINEAR IMPAIRMENTS IN A COMMUNICATIONS CHANNEL

CROSS REFERENCE TO RELATED APPLICATIONS

This application contains subject matter related to that of U.S. patent application Ser. No. 10/612,175, entitled "APPARATUS AND METHOD FOR LOCATING NONLINEARITIES IN A COMMUNICATIONS CHANNEL BY USE OF TIME DOMAIN REFLECTOMETRY", filed on 2 Jul. 2003 in the name of Paul H. Bryant, commonly assigned with this application and incorporated herein by reference.

BACKGROUND OF THE INVENTION

The invention concerns nonlinear impairments in a communications channel, and in a preferred embodiment, it is related to nonlinear impairments in a telephone line consisting of a pair of copper wires when used for digital subscriber line (DSL) communication. The invention may also relate to nonlinear impairments in other types of transmission lines consisting of metal conductors, including coaxial cables, whether these are used for DSL, or for other types of high speed or wideband communications.

DSL service is intended to extend and enhance the capabilities of the standard voice communication telephone network (generally referred to by the acronym POTS meaning "plain old telephone service"). Because of the worldwide scope of the installed telephone network it is an attractive candidate for shared use with the expanding high speed digital communication technology embodied in digital data transmission systems such as, the Integrated Digital Services Network, (IDSN), Asymmetric Digital Subscriber Line (ADSL), and Very high bit rate Digital Subscriber Line (VDSL). In this application we use the term DSL to refer to all types of digital communication technologies that operate on telephone or other conducting lines, including but not limited to those just mentioned. The voice channel of the standard telephone network utilizes only the relatively low frequency electromagnetic spectrum, and as the network's lines are actually capable of carrying broadband electromagnetic signals through the megahertz range, digital systems have been designed to share these lines without significant interference during simultaneous voice and data transmissions. Designed for transmission via the standard telephone network, the earliest digital system implementation having a transfer rate greater than 2400 bps was ISDN in 1984 with a basic rate of 144 Kbps. Continuing technical improvements and sophisticated modulation methods expanded the digital data transfer rates and, by 1999 ADSL systems installed in the standard telephone network were capable of transfer rates of up to 7 MHz. ADSL utilizes Discrete Multi-Tone (DMT) multi-carrier technology and QAM modulation for data transmission over the upper frequency band of the standard telephone network which it shares with telephone voice communications.

The standard telephone network has continued expanding in response to increasing national and international telephone system requirements. New segments of telephone line have been added to existing lines to create an inter-connected network providing broad geographical coverage. The latest telephone system technology provides high speed multiplexed fiber optic interconnections between central offices, but much of the standard telephone network consists of earlier installed twisted pairs of copper wire (also simply "twisted pairs"). These twisted pairs are particularly common in the connections between central telephone offices and the ultimate subscriber premises or other user sites.

In making the connection from the central office to a customer premises, a line will normally contain a number of splices. Splices between copper wires take many forms in the standard telephone system. In this application, a splice refers to the physical joining of the end of one section of wire with the beginning of another to retain them in contact in order to provide electrical continuity between them. Splices may be formed, for example, using solder joints, screw terminals, crimp-on connectors, punch-down blocks and twisted wires. Splices will commonly occur for example at a demarcation box where a line from a central office connects to in-house wiring of a customer premises. Businesses usually have punch-down blocks various internal lines are spliced to the appropriate external lines. Lines will commonly also be spliced at one or more junction boxes between the central office and customer premises, as well as at the central office itself.

It is well known that splices are susceptible to electrical impairment from corrosion or oxidation. Expansion and contraction due to thermal effects may also play an important role in degrading the quality of the electrical contact of a splice. These impairments may be nonlinear in nature. If uncorrected, such impairments cause attenuation and distortion of the electromagnetic signals traveling over a transmission line consisting of a twisted pair with one or more splices. These impairments are particularly burdensome for very high frequency and high amplitude digital transmission, limiting the transmission range to the subscriber site as well as the attainable error free data transfer rate. Of course, not all splices exhibit such deleterious effects on transmission. However, those that do are termed "bad" or "oxidized" splices in the rest of this discussion.

Although it is commonly known in the art that splices with poor or oxidized contacts could have a nonlinear character, it is not generally appreciated that a significant degree of nonlinearity is very frequently present in such splices. There are (at least) two mechanisms that produce such effects: (1) An oxide layer between the metal conductors where they contact each other in a splice produces a metal-oxide-metal (MOM) junction; (2) A very constricted metallic connection between the metal conductors where they contact each other in a splice produces a metal to metal point contact (MMPC) junction. Both of these mechanisms produce nonlinearities that are symmetrical in nature so that reversing the direction of current flow produces similar results. In MOM junctions the dominant conduction mechanism is quantum tunneling of electrons through the thin oxide layer. Analysis of the physics of tunneling shows that this junction has relatively poor conductivity near zero voltage, but that conductivity improves as the voltage increases. For the MMPC junction nonlinearity comes about when the diameter of the contact area between the two bulk conductors is small enough that it begins to approach the mean free path of the electrons in the metal. Analysis of this case shows an opposite type of nonlinearity, one in which the conductivity is relatively good near zero voltage but decreases as the voltage increases. Both types can be found in existing standard telephone network lines, but this invention pertains primarily to those nonlinear junctions of the MOM (or similar) type, which conduct poorly at low voltage.

It has long been appreciated that oxidized joints exist in lines of the standard telephone network, but two fortuitous operational aspects of the network tend to reduce interference caused by splices in telephone voice communication. In the first instance, when an "on hook" telephone is about to receive a call, the central office applies a ringing voltage of 90 v ac to the twisted pair connected to the phone, and an appreciable alternating current (ac) flows in the line. It has been conjectured that ringing current having a high enough amplitude breaks down the high resistance oxide film that may form in a splice in the twisted pair, allowing a partial ohmic low resistance contact between the wires at the splice. Second, the central telephone office provides a continuous direct current (dc) battery voltage, across the twisted pair connected to a subscriber's telephone. When the telephone is "on hook" it presents high impedance to the line, and no dc current flows from the central office battery through the subscriber's twisted pair. When the telephone is "off hook" for voice communication, the telephone's low impedance is across the twisted pair, and current flows from the central office battery, down the line and through the telephone set. Thus the ringing current and off hook current tend to reduce the deleterious effects of splice impairment on telephone communication by causing electrochemical changes to the splice. These changes are irreversible and remain in effect after the current is removed, i.e. when the phone stops ringing or is hung up. However, these effects are much less beneficial in the case of DSL data communications. This is because the signal levels are much higher in this case and therefore interact much more strongly with the bad splice. There is also a much greater sensitivity to any nonlinearity present in the splice characteristics.

In the art, telephone lines that do not have ring current or battery current—for example, ISDN lines—are termed 'dry lines.' In such lines it is a common practice to inject a current specifically for the purpose of reducing the severity of oxidized contacts in the line. Such a current is designated as "sealing current" or "wetting current". Sealing current is intended to cause permanent change to the bad splices that remains when the current is removed, and also to discourage oxides from forming in the first place. The current may be applied continuously or applied periodically for a short duration. Some studies have suggested that sealing current may not be helpful. Sealing current is never applied to wet lines since they already benefit from the similar effects of ringing current and off hook current.

SUMMARY OF THE INVENTION

Rather than attempting to prevent formation, or to cause the breakdown, of the oxide layer at the contact surface or surfaces of a bad splice as taught in the prior art, the present invention treats an oxidized splice as a circuit element exhibiting specific electrical characteristics to be considered in reducing, mitigating or eliminating the splice's detrimental effects on DSL performance on a transmission line. As a circuit element, an oxidized splice is assumed to have a nonlinear characteristic typical for a MOM junction; a current/voltage relationship that has a relatively low slope near the origin, with the slope increasing in magnitude for both positive and negative voltage excursions. The ac impedance presented by the oxidized splice, i.e. $\Delta V/\Delta I$, where $\Delta V$ is the increment in voltage across the splice, and $\Delta I$ is the current through the splice, is largest in the vicinity of the origin of the $\Delta V/\Delta I$ curve. At this operating point, the oxidized splice will cause the greatest attenuation of incoming signals as well as the greatest reflection or echo of outgoing signals (both effects are undesirable). Bad splices are also known to sometimes be unstable, their properties varying unpredictably with time. This instability is in addition to the inherent nonlinearity of the impairment and, is highly detrimental to DSL operation. As might be expected, the effects of the instability will be most strongly felt when the impedance of the splice is greatest, that is when operating in the vicinity of the origin of the current/voltage relationship. The present invention teaches biasing the nonlinear circuit element so that the operating point is moved away from the origin to a definite, stable, sloped portion of the I/V curve. This provides a stable, nonlinear ac impedance which is amenable to compensation by use of the techniques disclosed in U.S. patent application Ser. No. 09/968,063 entitled "MULTISTAGE EQUALIZER THAT CORRECTS FOR LINEAR AND NONLINEAR DISTORTION IN A DIGITALLY MODULATED SIGNAL", filed Oct. 1, 2001 in the name of Paul H. Bryant, and U.S. patent application Ser. No. 10/456,270, entitled "A MULTISTAGE NONLINEAR ECHO-CANCELLER FOR DIGITAL COMMUNICATION SYSTEM WITH OR WITHOUT FREQUENCY DIVISION DUPLEXING", filed Jun. 6, 2003 in the name of Paul H. Bryant. Both of these applications are commonly assigned with this application, and both are hereby incorporated by reference.

In an implementation of the invention in a standard telephone network, one method of generating the bias current in a telephone line having one or more splices is to set or change the operating point of a bad splice by placing a conducting element (a resistor, for example) across the network line. This may be done, for example, in the modem of a DSL subscriber. Biasing current then flows from the central office battery through the line to bias the impairment caused by the bad splice with the subscriber's telephone instrument still "on hook". The ohmic magnitude of resistor is selected for optimum stability of the impairment, with the limitation that the dc current level should be less than that which would actuate the central office circuit generating the subscriber's dial tone. With the impedance reduced and stabilized, nonlinear correction techniques disclosed in the above-referenced applications may be applied in DSL operation on the shared standard telephone network line. It is likely that a bias current would not be applied in all cases, but rather only in those where a relatively strong impairment was detected in the line. One method of detecting and locating such impairments is disclosed in the above referenced '175 application.

DESCRIPTION OF THE PREFERRED EMBODIMENTS

The invention reversibly reduces the detrimental effects of one or more passive nonlinear impairments in a transmission line. Each of the nonlinear impairments is characterized by an operating curve. When communications equipment such as a telephone, a modem, or other equivalent appliance is connected to the transmission line, a bias current is applied to the transmission line with a magnitude selected for biasing at least one of the nonlinear impairments to an operating point in a stable, linear region of its operating curve. Although the invention is explained in terms of a telephone network in the description that follows, this is for illustration, and is not intended to limit the scope of the appended claims in any way.

Figure 1:
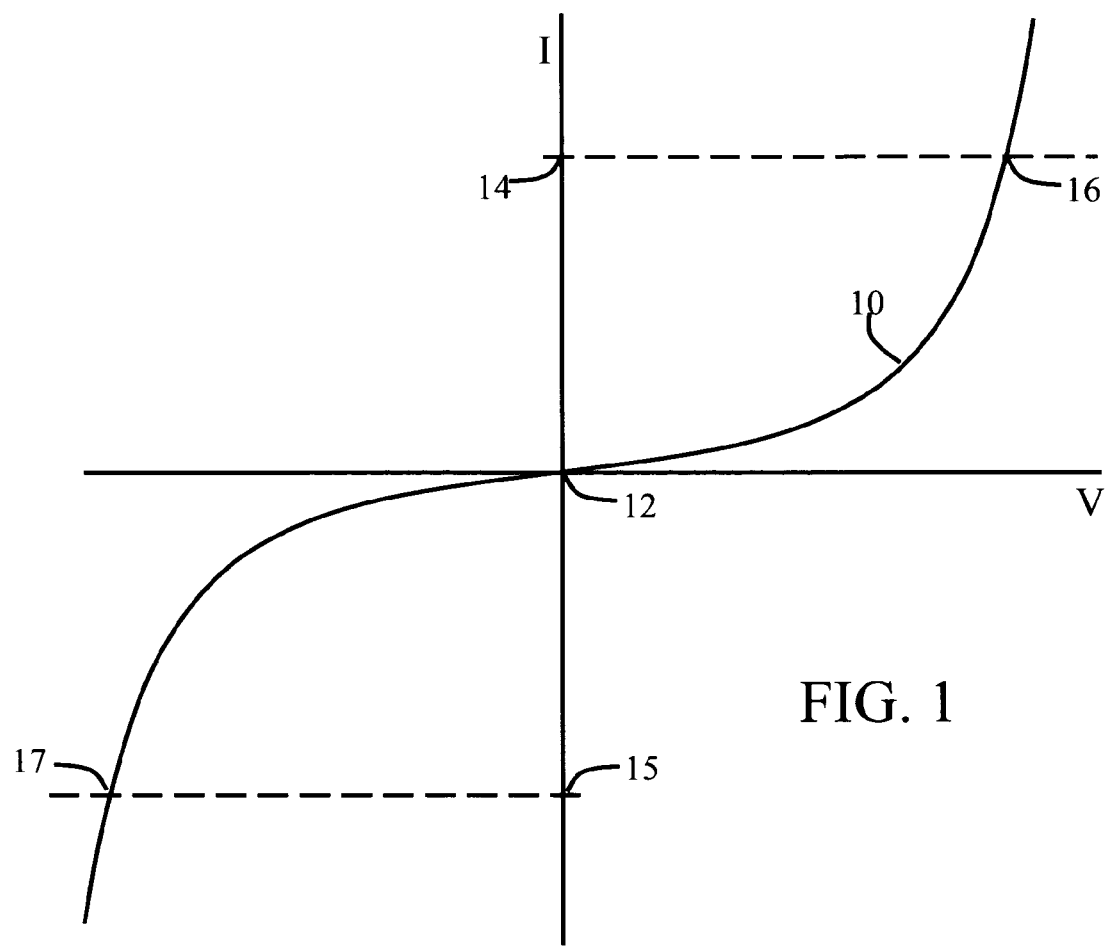
FIG. 1 is a curve of the current I as a function of the voltage V of a nonlinear impairment of the MOM or similar type.

Referring now to FIG. 1, a V (voltage) vs. I (current) curve 10 (which may also be termed an "operating curve") illustrates the nonlinear variation of current with respect to voltage for a typical nonlinear impairment associated with a splice on a twisted pair of copper wires. In the vicinity of the origin 12, the slope of the I/V curve 10, when no bias current flows, is relatively small. For strong impairments the slope will be essentially horizontal. In other words, for a small change in voltage, the current change is negligible, which is equivalent to very high impedance at the point 12. Because the impedance remains high and variable for small changes of voltage about the origin of this unbiased junction, it may cause significant attenuation as well as serious distortion to a signal conducted through the junction. Such a junction may generate a strong distorted echo of the signal. It may also lead to significant nonlinear coupling between outgoing and incoming signals. These effects are all undesirable and could impair the effective compensation for the presence of the strong impairment. For correction of impairment effects in accordance with the invention, a current 14 traversing the impairment biases the nonlinear impairment at the point 16 of the operating curve 10. The ac impedance at the operating point 16, as seen by a DSL signal, is equal to (1/slope) of the curve 10 and is substantially reduced. Setting the bias current in the twisted pair where the splice is located may provide sufficient improvement in the characteristics of a strong impairment for successful DSL error correction as taught in the above referenced applications. It will be noted that the practice of the invention is independent of the direction of current flow. For a negative current 15 an operating point 17 is realized. Setting the current at some magnitude level establishes an operating point on the operating curve that is predetermined by the curve's characteristics. Testing performance at that magnitude level may lead to changing the magnitude level of the applied current in order to achieve better performance.

Figure 2:
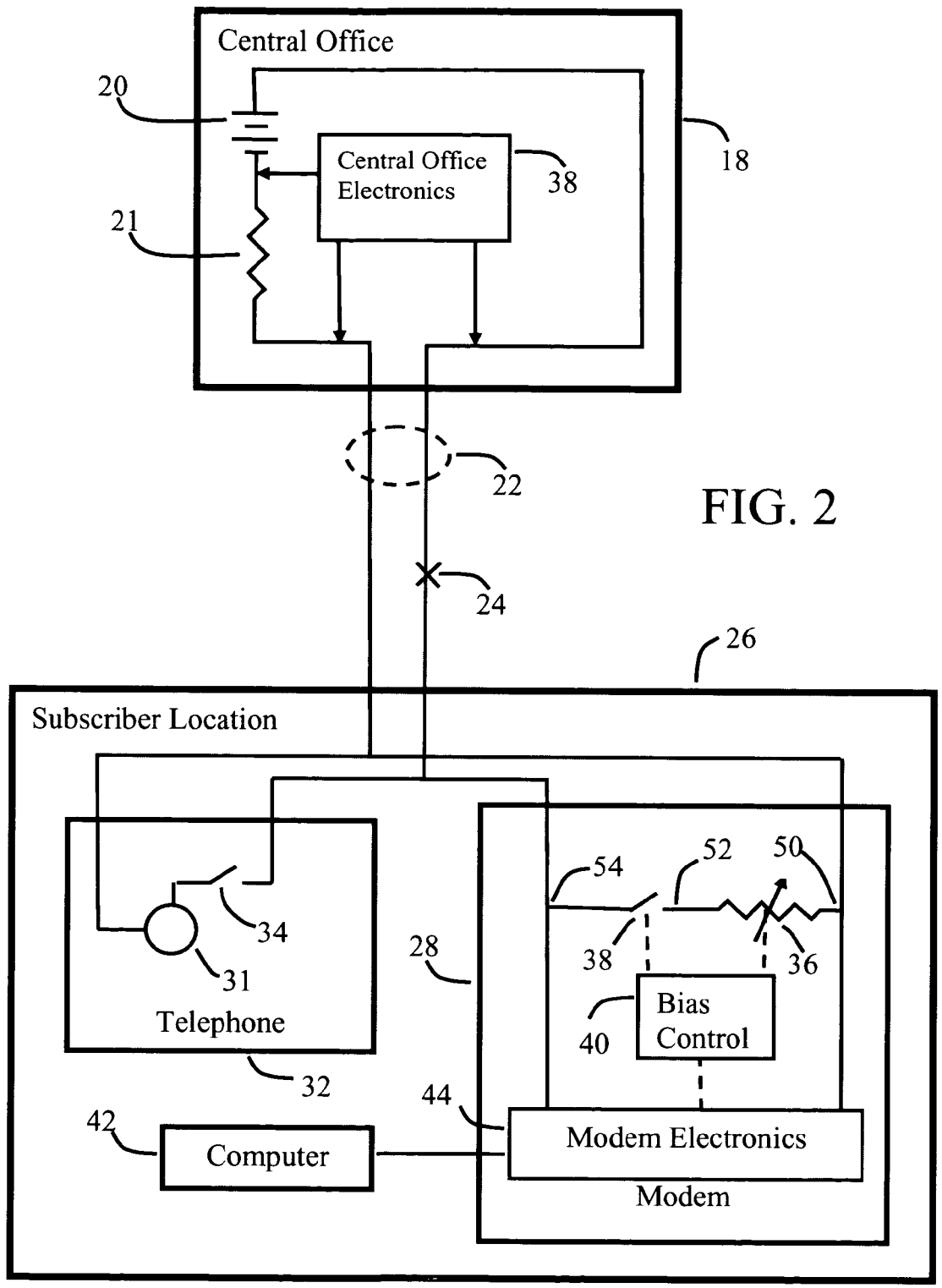
FIG. 2 is a drawing of an embodiment of the invention used in a standard telephone network DSL installation.

The invention is illustrated in a preferred embodiment seen in FIG. 2. A (simplified) telephone central office ("CO") 18 includes a battery 20, typically one providing 50 volts, and a current limiting resistor 21 typically with a magnitude of 1 kΩ across a telephone line 22 consisting of a pair of twisted copper wires, which may have a nonlinear impairment 24 in the form of a bad splice. The line 22 connects the CO 18 with the subscriber location 26. The CO also contains known equipment 37 to perform a variety of tasks including sensing when a subscriber's telephone goes off hook, providing the "dial tone", decoding dialing signals from a subscriber's telephone, coupling audio signals on the telephone line 22 into a telephone network (not shown), and coupling data signals on the telephone line 22 to the Internet. The telephone line 22 runs from the central office 18 to the subscriber location 26. Sharing the telephone line 22 at the subscriber location 26 is a DSL modem 28, and a telephone 32. The modem 28 would typically be connected to a computer (or computer network) 42. The modem electronics 44 may include a nonlinear multistage equalizer and/or echo canceller of the types disclosed in the previously mentioned '063 and '270 applications. The telephone 32 is shown "on hook", i.e. the hook contact 34 is open, disconnecting the telephone electronics 31 so that, as shown, the telephone 32 is not in use and is not electrically across the telephone line 22, and no current flows in the telephone line 22. The invention may be implemented by a conducting device, such as a resistor 36, in combination with a switch or contact 38, with both under control of a bias control unit 40. By controlling the state or condition of the switch 38, the bias control unit 40 selectively places the resistor 36 across the line 22 so that current flows from the battery 20, through the impairment 24, through the switch or contact 38 and the resistor 36, and back to the battery 20, while telephone 32 remains "on hook". By means of the bias control unit 40, the bias current through the line 22 may be set for optimum performance of the DSL system 28. The resistor 36 is illustrated as an adjustable device such as a potentiometer whose ohmic magnitude of the resistor 36 is adjusted by the bias control unit 40, so that the bias current is less than the amount required to activate the dial tone circuit in the electronics 37 at the central office 18.

For purposes of illustration, and with further reference to FIG. 2, the resistor 36 is an adjustable multi-terminal device having a first terminal and a second terminal connected or coupled to one wire of the transmission line 22 at 50. The switch or contact 38 has a first terminal connected or coupled at 52 to the first terminal of the resistor 36. The second terminal of the switch or contact 38 is connected or coupled at 54 to the second wire of the transmission line 22. Both the resistor 36 and the switch or contact 38 have control terminals that receive control signals from the bias control 40. The control signals put forth by the bias control 40 for the switch or contact 38 include at least a first signal to close the switch or contact 38, thereby connecting the resistor 36 across the wires of the transmission line 22. A second control signal for the switch or contact 38 opens the device, removing the resistor 36 from across the wires of the transmission line 22. The signals produced by the bias control 40 for the resistor 36 selectively vary, change, or adjust the magnitude of resistance of this device, continuously or incrementally, to a value that establishes the magnitude of the bias current at a level for biasing at least one passive nonlinear impairments in the transmission line 22 to an operating point in a stable, more linear portion of its operating curve.

The invention has been described in detail with particular reference to a preferred embodiment thereof, but it will be understood that variations and modifications can be practiced without departing from the spirit and scope of the invention. For example, it would be within the spirit of the invention to use an active conducting device such as a current source in place of the resistor 36. The switch or contact 38 may, of course, be implemented by way of an electronic switching device rather than with an actual mechanical switch, which is shown only to illustrate the invention in the simplest light. Variations could also include application to systems other than a standard telephone network, and other means of generating and controlling the bias current.

I claim:

1. A method for reversibly reducing detrimental effects of one or more passive nonlinear impairments in a transmission line, each passive nonlinear impairment characterized by an operating curve, the method comprising:
   connecting communications equipment to the transmission line; and
   enabling a bias current through the transmission line;
   the bias current having a magnitude selected for biasing at least one of the passive nonlinear impairments to an operating point in a predetermined region of its operating curve.

2. The method of claim 1, wherein the transmission line connects a central office with a subscriber location, the communications equipment is telephone equipment, and the transmission line is a twisted pair.

3. The method of claim 1, wherein the transmission line is a coaxial cable.

4. The method of claim 2, wherein the twisted pair is connected at the central office to a DC power source for providing telephone service.

5. The method of claim 4, wherein the twisted pair is adapted for supporting data communications between the central office and the subscriber location.

6. The method of claim 5, the bias current originating from the DC power source.

7. The method of claim 6, wherein the magnitude of the bias current is selected for improving digital subscriber line (DSL) performance on the twisted pair.

8. A combination for reversibly reducing detrimental effects of one or more passive nonlinear impairments in a transmission line, each passive nonlinear impairment characterized by an operating curve, the combination comprising:
communications equipment for connection to the transmission line; and
a circuit in the communications equipment for enabling a bias current through the transmission line, the bias current having a magnitude selected for biasing at least one of the passive nonlinear impairments to an operating point in a predetermined region of its operating curve.

9. The combination of claim 8, wherein the transmission line connects a central office with a subscriber location, the communications equipment is telephone equipment, and the transmission line is a twisted pair.

10. The combination of claim 8, wherein the transmission line is a coaxial cable.

11. The combination of claim 9, wherein the twisted pair is connected at the central office to a DC power source for providing telephone service.

12. The combination of claim 11, wherein the twisted pair is adapted for supporting data communications between the central office and the subscriber location.

13. The combination of claim 12, the bias current originating from the DC power source.

14. The combination of claim 13, wherein the magnitude of the bias current is selected for improving digital subscriber line (DSL) performance on the twisted pair.

15. A modem for reversibly reducing detrimental effects of one or more passive nonlinear impairments in a transmission line, each passive nonlinear impairment characterized by an operating curve, the modem comprising:
a conductive element for connection across the transmission line; and
means for selectively connecting the conductive element across the transmission line to enable a bias current through the transmission line, the bias current having a magnitude selected for biasing at least one of the passive nonlinear impairments to an operating point in a predetermined region of its operating curve.

16. The modem of claim 15, wherein the transmission line is a twisted pair connecting a central office with a subscriber location.

17. The modem of claim 15, wherein the transmission line is a coaxial cable.

18. The modem of claim 16, wherein the twisted pair is connected at the central office to a DC power source for providing telephone service.

19. The modem of claim 18, wherein the conductive element is an adjustable resistor having a first terminal and a second terminal connected to one wire of the twisted pair and the means for connecting includes a switch having a first terminal connected to the second terminal of the adjustable resistor and a second terminal connected to the second wire of the twisted pair.

20. The modem of claim 19, wherein the means for connecting further includes a control unit connected to the adjustable resistor for adjusting the resistance of the adjustable resistor to a magnitude that causes the bias current to assume the selected magnitude, and connected to the switch for causing the switch to connect and disconnect the adjustable resistor across the twisted pair.

* * * * *